United States Patent
O'Clair et al.

(10) Patent No.: US 7,444,471 B1
(45) Date of Patent: Oct. 28, 2008

(54) METHOD AND SYSTEM FOR USING EXTERNAL STORAGE TO AMORTIZE CPU CYCLE UTILIZATION

(75) Inventors: Brian O'Clair, Foster City, CA (US); Dean Gaudet, San Francisco, CA (US)

(73) Assignee: Transmeta Corporation, Santa Clara, CA (US)

( * ) Notice: Subject to any disclaimer, the term of this patent is extended or adjusted under 35 U.S.C. 154(b) by 284 days.

(21) Appl. No.: 10/335,405

(22) Filed: Dec. 30, 2002

(51) Int. Cl.
*G06F 12/04* (2006.01)

(52) U.S. Cl. .................. 711/118; 711/213; 712/227

(58) Field of Classification Search ............. 711/202, 711/213, 218, 118; 712/227; 717/138
See application file for complete search history.

(56) References Cited

U.S. PATENT DOCUMENTS

| | | | | |
|---|---|---|---|---|
| 5,925,123 | A | * | 7/1999 | Tremblay et al. ............ 712/212 |
| 6,091,897 | A | * | 7/2000 | Yates et al. ................. 717/138 |
| 6,954,847 | B2 | * | 10/2005 | Coon et al. |
| 7,020,766 | B1 | * | 3/2006 | Wang et al. ................ 712/227 |
| 7,194,735 | B2 | * | 3/2007 | Barclay ..................... 717/136 |
| 2002/0099930 | A1 | * | 7/2002 | Sakamoto et al. ........... 712/227 |

FOREIGN PATENT DOCUMENTS

CA      2376327      *   5/2002

\* cited by examiner

*Primary Examiner*—Pierre-Michel Bataille (57) ABSTRACT

A method and system for using external storage to amortize CPU cycle utilization, wherein translated instructions are stored in a storage medium and subsequently accessed on a subsequent execution of a non-native application in order to amortize CPU cycles used in generating the translated instructions.

21 Claims, 5 Drawing Sheets

```
BEGIN AN INITIAL EXECUTION OF A NON-NATIVE APPLICATION
401
          │
          ▼
GENERATE TRANSLATED INSTRUCTIONS FROM THE NON-NATIVE
APPLICATION BY USING AN INSTRUCTION TRANSLATOR
402
          │
          ▼
STORE THE TRANSLATED INSTRUCTIONS WITHIN A CACHE
403
          │
          ▼
EXECUTE THE TRANSLATED INSTRUCTIONS ON THE CPU
HARDWARE
404
          │
          ▼
STORE THE TRANSLATED INSTRUCTIONS WITHIN AN EXTERNAL
STORAGE MEDIA
405
          │
          ▼
ACCESS THE TRANSLATED INSTRUCTIONS FROM THE EXTERNAL
STORAGE MEDIA UPON A SUBSEQUENT EXECUTION OF THE NON-
NATIVE APPLICATION AND EXECUTE ON THE CPU HARDWARE
406
```

METHOD AND SYSTEM FOR USING EXTERNAL STORAGE TO AMORTIZE CPU CYCLE UTILIZATION

TECHNICAL FIELD

The present invention relates generally to digital computer systems. More specifically, the present invention pertains to reducing execution overhead imposed on the processing environment of a digital computer system.

BACKGROUND ART

Many types of digital computer systems utilize translation or emulation to implement software based functionality. Generally, translation and emulation both involve examining a program of software instructions and performing the functions and actions dictated by the software instructions, even though the instructions are not "native" to the computer system. In the case of translation, the non-native instructions are converted, or translated, into a form of native instructions which are designed to execute on the hardware of the computer system. Examples include prior art translation software and/or hardware that operates with industry standard x86 applications to enable the applications to execute on non-x86 or alternative computer architectures. Generally, a translation process utilizes a large number of processor cycles, and thus, imposes a substantial amount of overhead. The performance penalty imposed by the overhead can substantially erode any benefits provided by the translation process. Thus what is required is a solution that can implement a computer software translation process while reducing the overhead penalty imposed on a user.

DISCLOSURE OF THE INVENTION

Embodiments of the present invention provide a method and system for using external storage to amortize CPU cycle utilization.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for using external storage to amortize CPU cycle utilization. Embodiments of the present invention implement a computer software translation process while simultaneously reducing the overhead penalty imposed on overall computer system performance. Embodiments of the present invention use external storage to amortize CPU cycle utilization, wherein translated instructions are stored in a storage medium and subsequently accessed on a subsequent execution of a non-native application in order to amortize CPU cycles used in generating the translated instructions. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "exporting" or "retrieving" or "translating" or the like, refer to the action and processes of a computer system (e.g., computer system 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE PRESENT INVENTION

Figure 1:
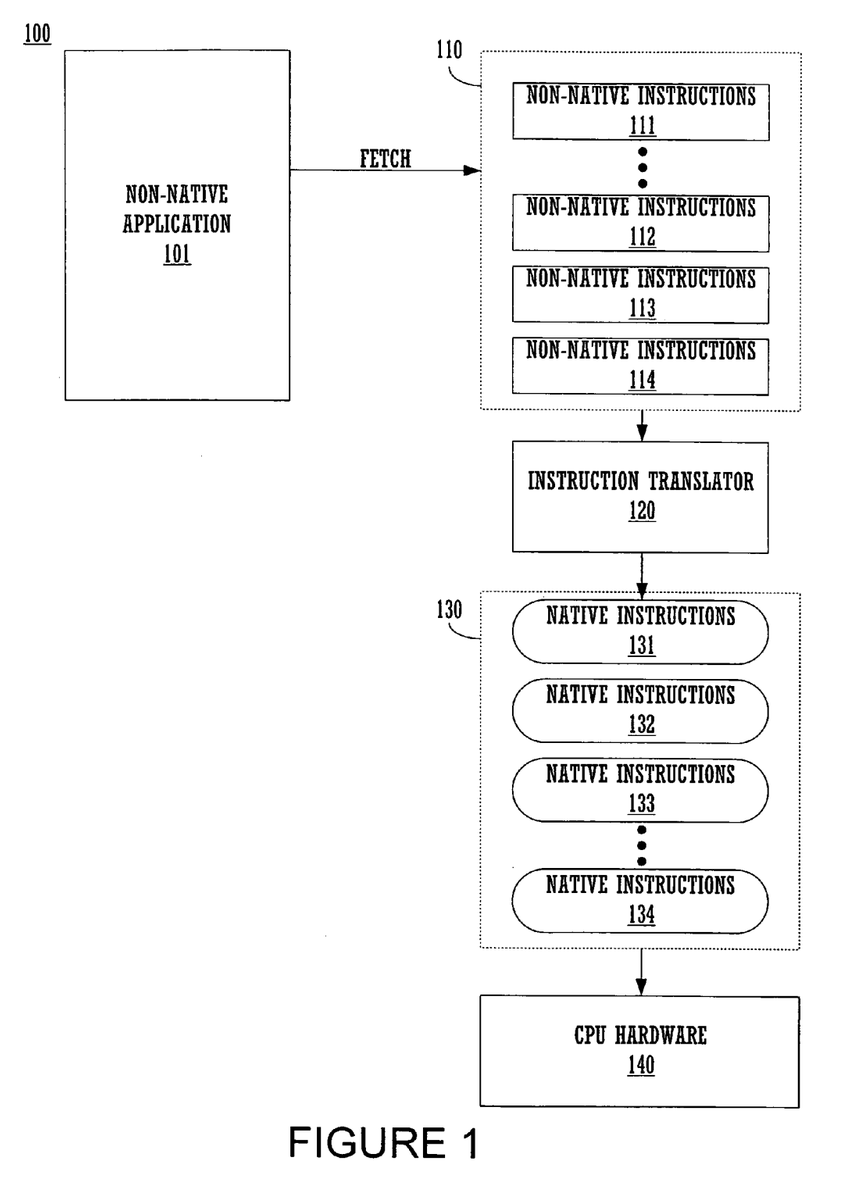
FIG. 1 shows a first diagram of the operation of a system used to implement an instruction translation process in accordance with one embodiment of the present invention.

FIG. 1 shows a diagram of the operation of a system 100 used to implement an instruction translation process in accordance with one embodiment of the present invention. As depicted in FIG. 1, system 100 includes a non-native application 101 having its constituent instructions fetched from its storage location (e.g., memory, disk, network, etc.) to build a sequence 110, or block, of non-native instructions for processing by an instruction translator 120. The instruction translator 120 translates the non-native instructions 111-114 to generate a corresponding sequence 130 (e.g., block) of native instructions. The native instructions 131-134 comprising the sequence 130 are then executed by the CPU hardware 140 of the system 100.

Thus, the system 100 embodiment shown in FIG. 1 implements a translation process wherein the non-native application 101 is executed by the system 100 and, for example, the functionality of the non-native application 101 is provided to a user.

Depending upon the specific requirements of a particular implementation, the non-native application 101 can be an x86 application and the non-native instructions 111-114 comprising the application 101 can be x86 instructions. The CPU hardware 140 executing the translated native instructions can be a VLIW (very long instruction word) CPU hardware unit and the native instructions 131-134 fed into the CPU hardware 140 can be VLIW instructions. In such an implementation, the VLIW instructions would be configured (e.g., by the instruction translator 120) to efficiently feed multiple pipeline front ends of the CPU hardware 140 to achieve maximum concurrency and parallelism. Descriptions of processor architectures implementing translation can be found in commonly assigned U.S. Pat. No. 5,958,061, HOST MICROPROCESSOR WITH APPARATUS FOR TEMPORARILY HOLDING TARGET PROCESSOR STATE, which is incorporated herein in its entirety.

It should be noted that other types of non-native applications can be used in the translation process of the present invention, in addition to x86 applications (e.g., SPARC, MIPS, etc.). Similarly, the native instructions generated by the translation process can be other types of instructions besides VLIW instructions. Thus, at times it can be helpful for the reader's understanding to use the terms "target instruction" and "target application" to refer to the non-native instructions and the non-native application, while the terms "host instruction" and "host architecture" are used to refer to the native instructions and the CPU hardware that executes the native instructions.

Figure 2:
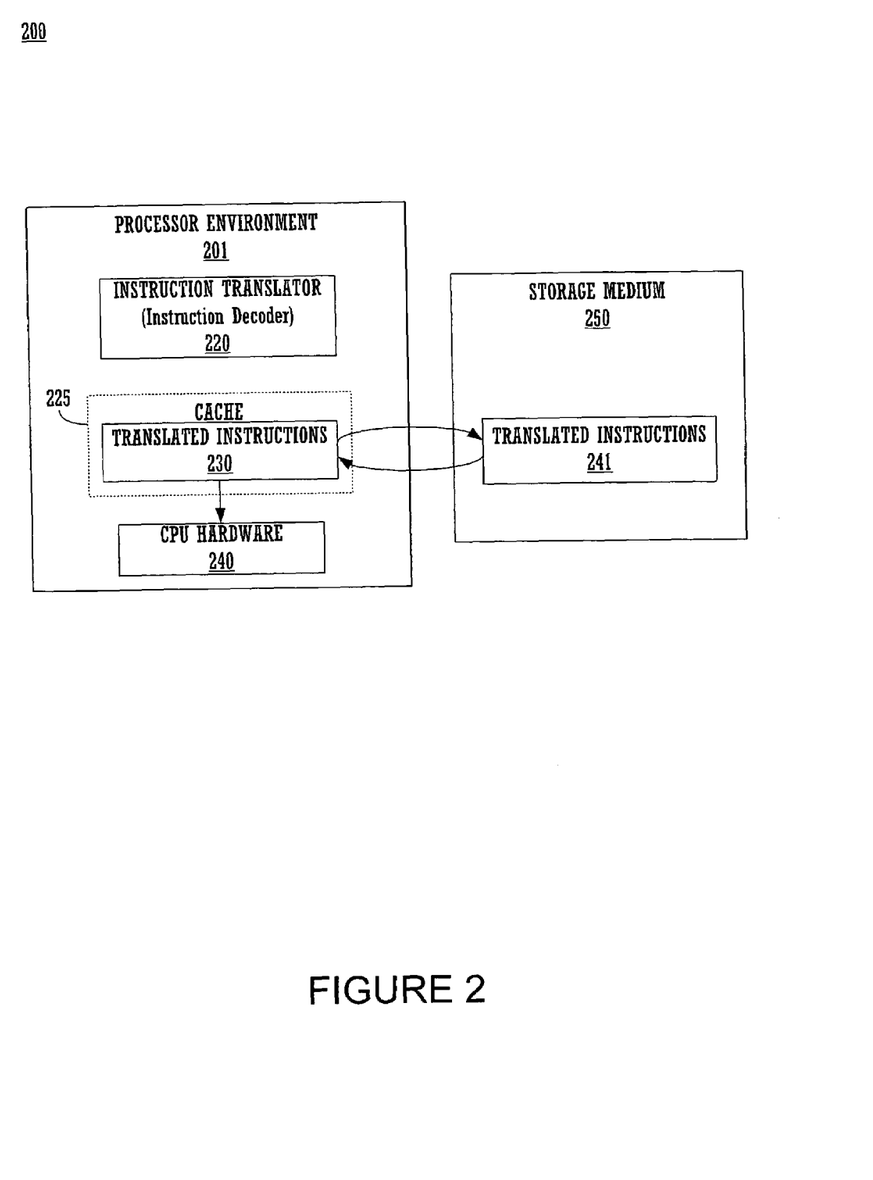
FIG. 2 shows a second diagram of the basic components of a system used to implement an instruction translation process in accordance with one embodiment of the present invention.

FIG. 2 shows a diagram of the basic components of a system 200 used to implement an instruction translation process in accordance with one embodiment of the present invention. As depicted in FIG. 2, system 200 shows a processor environment 201 including an instruction translator 220, a cache 225 storing the translated instructions 230, and CPU hardware 240.

The system 200 embodiment functions by implementing a method for using external storage to amortize CPU cycle utilization while executing the instruction translation process. In the present embodiment, non-native instructions from the non-native application (e.g., application 101 of FIG. 1) are fetched and translated by the instruction translator 220. The instruction sequence from the non-native application is translated by the instruction translator 220 into resulting translated instructions which can natively execute on the CPU hardware 240. The resulting translated instructions 230 are stored within the cache memory 225. The translated instructions 230 are executed by the CPU hardware 240 to implement the functionality of the non-native application.

Thus, in order to execute the instructions of the non-native application, the computer readable code comprising the non-native application is translated first into the translated instructions 230 which then execute very efficiently on the CPU hardware 240. Depending upon the specifics of the non-native application, the non-native application is entirely translated, or only portions (e.g., those portions of the non-native application which are most CPU intensive) of the non-native application are translated.

In accordance with embodiments of the present invention, the translated instructions 230, once generated by the instruction translator 220, are stored within the cache 225 and reused as often as possible. By reusing the translated instructions 230, the system 200 avoids having to execute the instruction translator 220 multiple times to translate the same non-native instructions. For example, as long as the non-native application executes in-context (e.g., as a process executing on the processor environment 201 as opposed to being context switched out to a swap file), the translated instructions 230 can be executed directly on the CPU hardware 240 without having to constantly re-translate the instructions using the instruction translator 220. This greatly reduces CPU overhead involved in executing the overall translation process. The reusing of the translated instructions 230 to implement the application functionality essentially takes the instruction translator 220 "out of the loop" and allows the CPU cycles consumed by the instruction translation process to be saved, along with saving the power consumed by executing the instruction translation process.

In accordance with embodiments of the present invention, in order to leverage the CPU cycle savings and the power savings provided by the reuse of the translated instructions 230, additional external memory of the storage medium 250 is used to save larger amounts of translated instructions 241. As shown in FIG. 2, the translated instructions 230 are stored within a cache 225. To increase the amount of memory available for storage, translated instructions can be saved outside of the cache 225 to the external storage medium 250 for later reuse. This greatly increases the storage area available for storing translated instructions. In so doing, the translated instructions resulting from very large non-native applications, or many different non-native applications, can be stored and later accessed to in order to amortize the CPU cycles (e.g., CPU cycles required to implement the translation process, power consumed by the translation process, and the like) required to generate the translated code.

Thus, when a non-native application which has been previously translated by the instruction translator 220 is subsequently encountered (e.g., after a context switch), the translated instructions (e.g., the translated instructions 241) corresponding to the application can be accessed from the storage medium 250, or retrieved from the storage medium 250 into the cache 225, and directly executed on the CPU hardware 240.

The storing of the translated instructions 241 provides additional benefits when the storage medium 250 is non-volatile. For example, in such case, when a non-native application is first started up, the non-native application can be instantiated completely from, or primarily from, the stored translated instructions 241 as opposed to the non-native application being read from the non-volatile storage medium, first translated by the instruction translator 220, and then instantiated. This greatly reduces the amount of time (e.g., CPU cycles) required to first start up the non-native application. As long as previously translated instructions 241 reside within the storage medium 250 (e.g., from a previous computing session), on a subsequent execution of the application, the operation of the instruction translator 220 can be avoided, or minimized, and the CPU cycles and power required to operate the instruction translator 220 can be amortized.

It should be noted that in one embodiment, the instruction translator 220 can be implemented as a hardware based instruction decoder 220 as found in many types of microprocessor architectures. In such embodiment, the instruction decoder 220 takes instructions for the application (e.g., x86 instructions) and decodes those instructions into "pipeline instructions" or "micro-architecture instructions" that efficiently feed the CPU hardware 240. For example, many processor architectures (e.g., processor environments) decode x86 instructions into more simple RISC-like micro-architecture instructions which then execute on the internal CPU hardware of the processor architecture. These micro-architecture instructions are then scheduled by the instruction decoder 220 such that they fill the multiple pipelines to achieve maximum usage and minimal stalling. In such architectures, the instruction decoder generally operates continuously, continuously decoding the x86 instructions into the constituent micro-architecture instructions which are then executed by the CPU hardware. In one embodiment, the decoded/translated instructions include higher-level optimizations such as, for example, speculation, loop unrolling, or operation reordering, in order to efficiently feed the CPU hardware.

In accordance with embodiments of the present invention, these constituent micro-architecture instructions comprise the translated instructions (e.g., translated instructions 230) which can be saved for reuse in the manner described above. By saving the translated instructions (translated instructions 241), embodiments of the present invention can implement the saving of the micro-architecture state of the processor environment 201. For example, in addition to saving micro-architecture instructions corresponding to arithmetic operations (integer additions, floating point, etc.), and the efficient order to execute them in, micro-architecture instructions corresponding to branch prediction information can also be saved. Thus, in such an embodiment, the target instructions are the x86 instructions and the host instructions are the micro-architecture instructions which execute on the CPU hardware 240. The instruction translator/instruction decoder 220 can be software based, hardware based, or some combination thereof.

Figure 3:
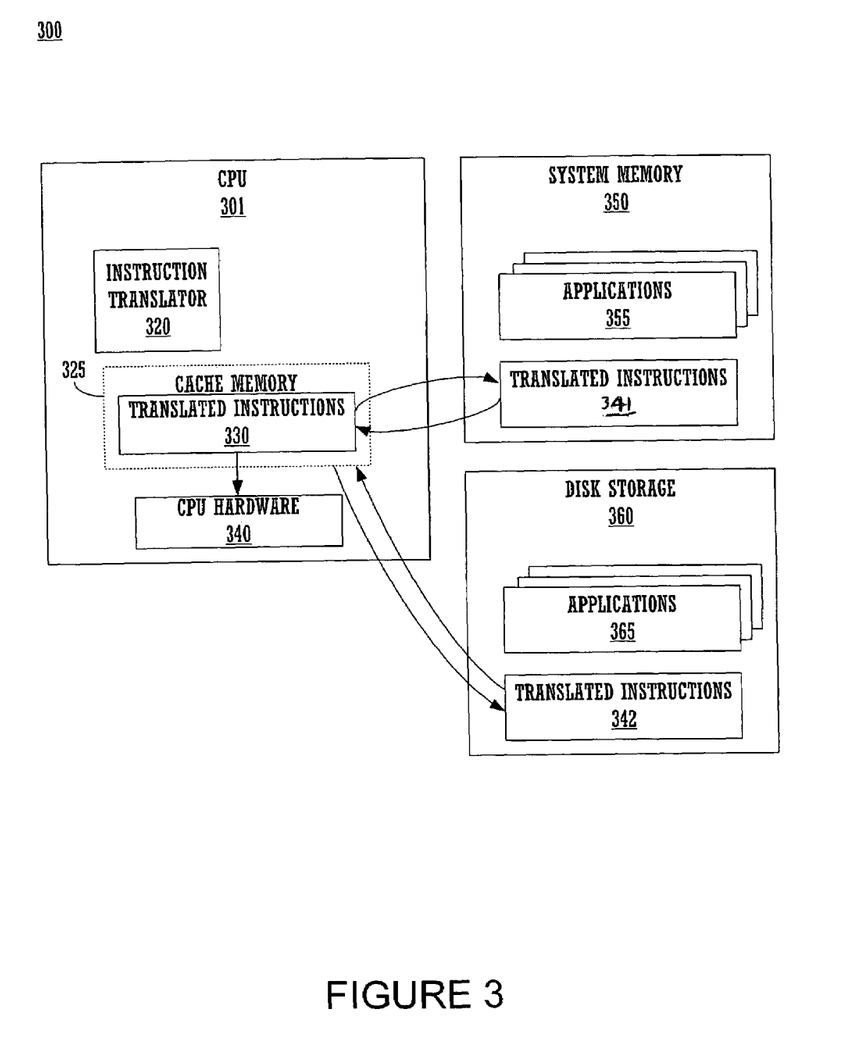
FIG. 3 shows a third diagram of the basic components of a system used to implement an instruction translation process in accordance with one embodiment of the present invention.

FIG. 3 shows a diagram of the basic components of a system 300 used to implement an instruction translation process in accordance with one embodiment of the present invention. As depicted in FIG. 3, system 300 shows a CPU integrated circuit 301 including an instruction translator 320, a cache 325 storing the translated instructions 330, and CPU hardware 340.

In the system 300 embodiment, the CPU integrated circuit 301 provides the processor environment for the instruction translator 320, the cache 325 storing the translated instructions 330, and the CPU hardware 340. The system 300 embodiment also shows the saving of translated instructions 341 into system memory 350 and the saving of translated instructions 342 into disk storage 360. In other respects, the system 300 embodiment functions in a manner substantially similar to the system 200 embodiment described above in the discussion of FIG. 2. Target, or non-native, applications 355 and/or applications 356 are instantiated by first translating their instructions using the instruction translator 320 and storing the resulting translated instructions into the cache memory 325. Thus, on subsequent executions of the applications 355 and/or applications 365, the CPU cycles consumed by the operation of the instruction translator 320 are then amortized by accessing stored translated instructions 341 or stored translated instructions 342 and executing the stored translated instructions directly on the CPU hardware 340. The objective is to opportunistically access the stored instructions 341-342 (e.g., through a number of different computer implemented means such as DMA transfer, etc.) and execute them on the CPU hardware 340.

The system 300 embodiment explicitly shows storing the translated instructions 330 in both the system memory 350 and the disk storage 360. Although the system memory 350 is generally volatile, the system memory 350 typically has a much larger storage capacity in comparison to the cache memory 325. The disk storage 360 provides even greater storage capacity in comparison to the system memory 350. Additionally, the disk storage 360 is non-volatile, and can thus store the translated instructions 342 for use during multiple computing sessions (e.g., wherein the computer system is turned off between sessions). However, access to the translated instructions 342 is generally slower than access to the translated instructions 341 residing in system memory 350.

Figure 4:
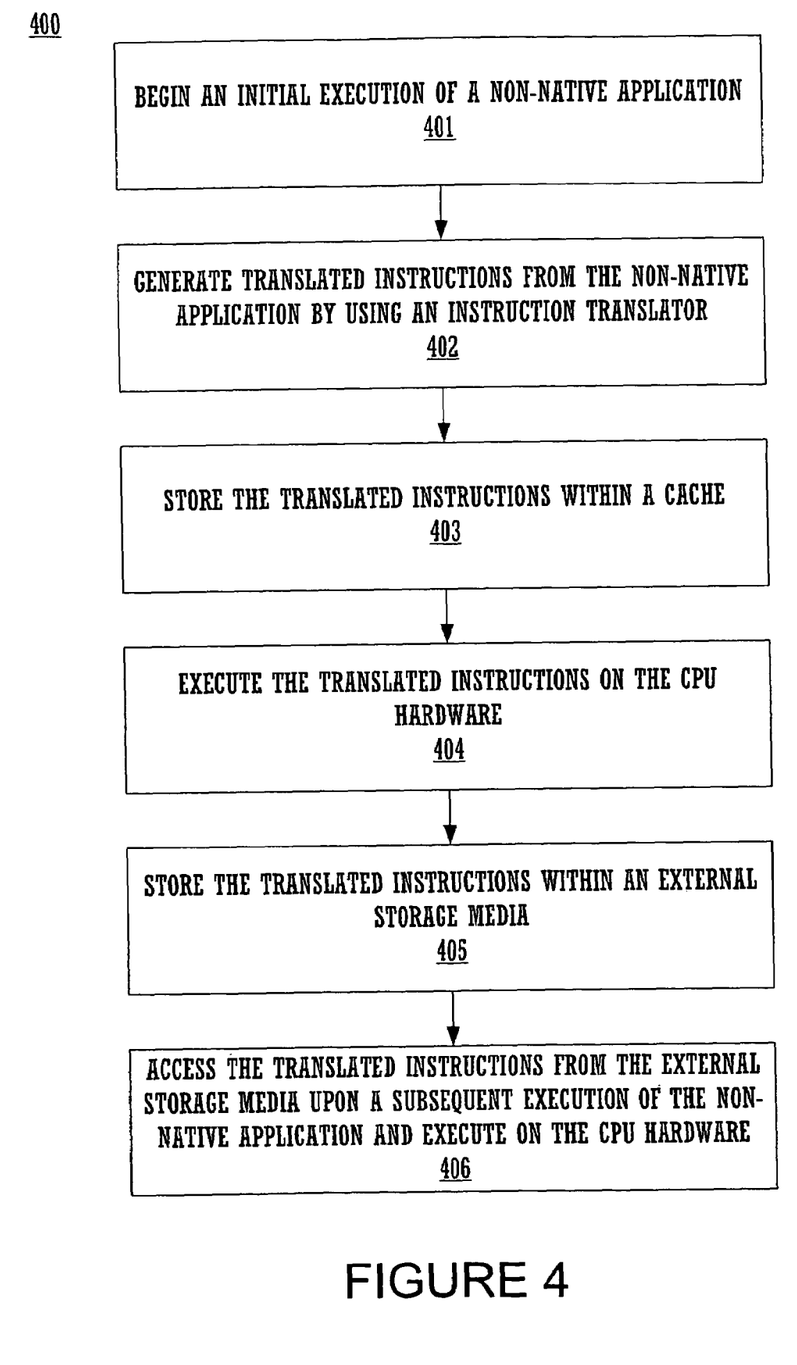
FIG. 4 shows a flowchart of the steps of a CPU cycle amortization process in accordance with one embodiment of the present invention.

FIG. 4 shows a flowchart of the steps of a process 400 in accordance with one embodiment of the present invention. As depicted in FIG. 4, process 400 shows the steps involved in a translation CPU cycle amortization process as implemented by a computer system (e.g., system 300) in accordance with one embodiment of the present invention.

Process 400 begins in step 401, where an initial execution of a non-native, or target, application is begun. In step 402, translated instructions are generated using a instruction translator (e.g., instruction translator 320) within a processor environment (e.g., CPU 301). In step 403, the resulting translated instructions are stored within a cache memory within the processor environment. In step 404, as the translated instructions are being stored within the cache, the translated instructions are executed by the CPU hardware. In step 405, the translated instructions are stored in a storage medium (e.g., system memory 350) external to the processor environment. As described above, the translated instructions can be stored within, for example, system memory, disk storage, or other types of storage media external to the processor environment. In step 406, upon a subsequent execution of the non-native application, the translated instructions stored in the storage medium are accessed and are directly executed by the CPU hardware of the processor.

Thus, embodiments of the present invention provide a method and system for using external storage to amortize CPU cycle utilization. Embodiments of the present invention implement a computer software translation process while simultaneously reducing the overhead penalty imposed on overall computer system performance. Embodiments of the present invention use external storage to amortize CPU cycle utilization, wherein translated instructions are stored in a storage medium and subsequently accessed on a subsequent execution of a non-native application in order to amortize CPU cycles used in generating the translated instructions.

Computer System Platform

Figure 5:
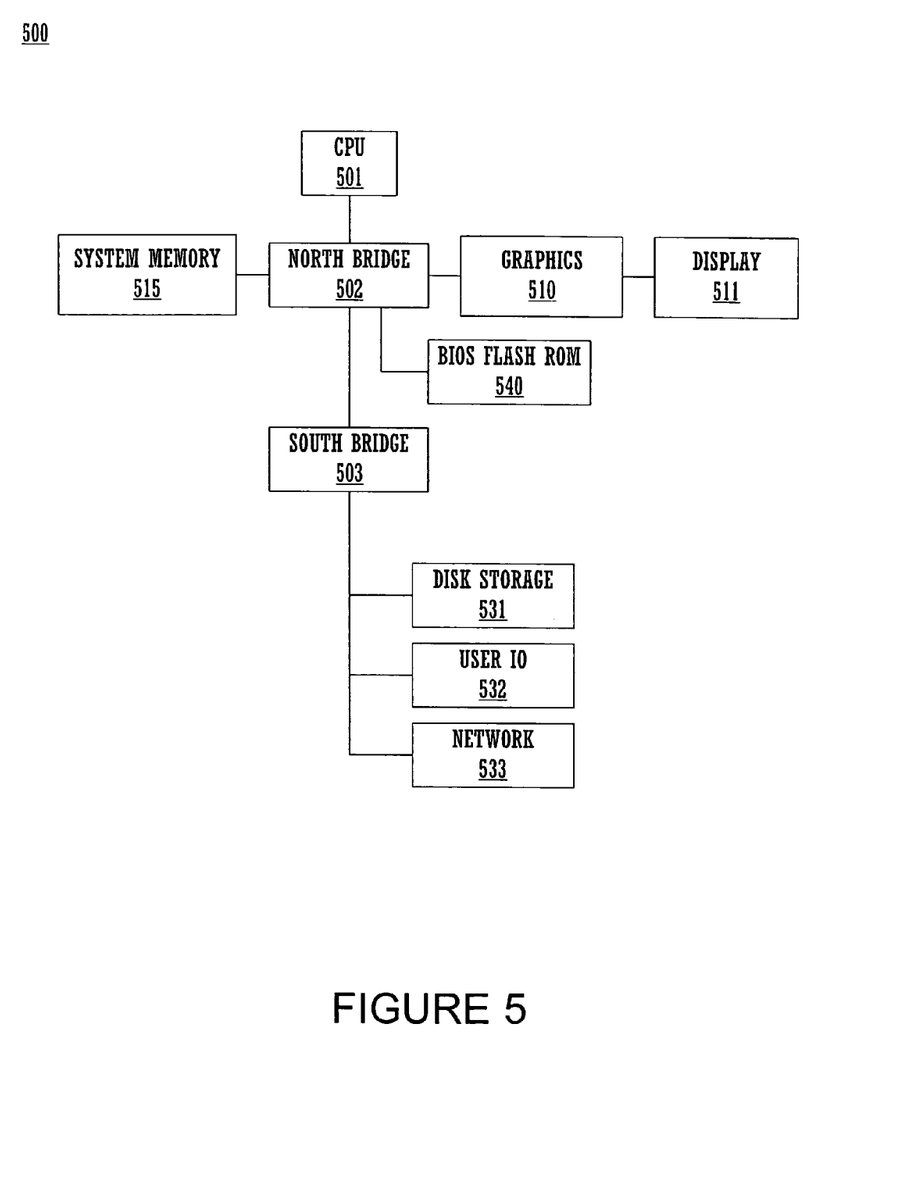
FIG. 5 shows the general components of a computer system in accordance with one embodiment of the present invention.

With reference now to FIG. 5, a computer system 500 in accordance with one embodiment of the present invention is shown. Computer system 500 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 500) and are executed by the CPU 501 of system 500. When executed, the instructions cause the system 500 to implement the functionality of the present invention as described above.

In general, system 500 comprises at least one CPU 501 coupled to a North bridge 502 and a South bridge 503. The North bridge 502 provides access to system memory 515 and a graphics unit 510 that drives a display 511. The South bridge 503 provides access to a plurality of coupled peripheral devices 531-533 as shown. Computer system 500 also shows a BIOS ROM 540 that stores BIOS initialization software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for using external storage to amortize CPU cycle utilization, comprising:

generating microarchitecture instructions for execution by a CPU microarchitecture by using an instruction decoder within a processor environment, the microarchitecture instructions generated during an initial execution of a non-native application, wherein the microarchitecture instructions comprise pipeline instructions for the CPU hardware;

storing the microarchitecture instructions in a storage medium external to the processor environment; and accessing the microarchitecture instructions in the storage medium to execute on the CPU hardware of the processor environment, wherein the microarchitecture instructions are accessed on a subsequent execution of the non-native application.

2. The method of claim 1 further comprising:

storing the microarchitecture instructions in a cache memory for the initial execution of the non-native application.

3. The method of claim 1 wherein the pipeline instructions comprise very long instruction word (VLIW) instructions.

4. The method of claim 1 wherein the microarchitecture instructions comprise a micro-architecture state of the processor environment.

5. The method of claim 1 wherein the microarchitecture instructions comprise branch prediction information.

6. The method of claim 1 wherein the non-native instructions comprise x86 instructions and the non-native application comprises an x86 application.

7. The method of claim 1 wherein the microarchitecture instructions are accessed on the subsequent execution of the non-native application to amortize CPU style utilization required to generate the microarchitecture instructions.

8. The method of claim 7 wherein the amortization of CPU cycle utilization is configured to conserve power for the subsequent execution of the non-native application in comparison to the initial execution of the non-native application.

9. A system for using external storage to amortize CPU cycle utilization, comprising:

an instruction decoder for generating microarchitecture instructions for execution by a processor microarchitecture within a processor environment, the microarchitecture instructions generated during an initial execution of a target application;

an external storage medium external to the processor environment, the storage medium coupled to receive the microarchitecture instructions and store the microarchitecture instructions; and CPU hardware configured to access the microarchitecture instructions and to execute the microarchitecture instructions, wherein the microarchitecture instructions are accessed on a subsequent execution of the target application, and wherein the microarchitecture instructions comprise pipeline instructions for the CPU hardware.

10. The system of claim 9 further comprising: a cache memory configured to store the microarchitecture instructions for the initial execution of the target application.

11. The system of claim 9 wherein the pipeline instructions comprise very long instruction word (VLIW) instructions.

12. The system of claim 9 wherein the microarchitecture instructions comprise a micro-architecture state of the processor environment.

13. The system of claim 9 wherein the microarchitecture instructions comprise branch prediction information.

14. The system of claim 9 wherein the target instructions comprise x86 instructions and the target application comprises an x86 application.

15. The system of claim 9 wherein the microarchitecture instructions are accessed on the subsequent execution of the target application to amortize CPU cycle utilization required to generate the translated instructions.

16. The system of claim 15 wherein the amortization of CPU cycle utilization is configured to conserve power for the subsequent execution of the target application in comparison to the initial execution of the target application.

17. A computer readable storage media for implementing external storage to amortize CPU cycle utilization, the media storing computer readable code which when executed by a processor causes the processor to implement a method comprising:

generating microarchitecture instructions by using an instruction decoder for execution by a processor microarchitecture within a processor environment, the microarchitecture instructions generated during an initial execution of a target application, wherein the microarchitecture instructions comprise pipeline instructions for the CPU hardware;

storing the microarchitecture instructions in a storage medium external to the processor environment; and accessing the microarchitecture instructions in the storage medium to execute on the CPU hardware of the processor environment, wherein the microarchitecture instructions are accessed on a subsequent execution of the target application.

18. The computer readable media of claim 17 further comprising: storing the microarchitecture instructions in a cache memory for the initial execution of the target application.

19. The computer readable media of claim 17 wherein the pipeline instructions comprise very long instruction word (VLIW) instruction.

20. The computer readable media of claim 17 wherein the microarchitecture instructions comprise a schedule for using a plurality of pipelines of the CPU hardware.

21. The computer readable media of claim 17 wherein the microarchitecture instructions include optimizations including speculation, loop controlling, or operation reordering.

* * * * *